(12) United States Patent
Terry et al.

(10) Patent No.: US 7,460,877 B2
(45) Date of Patent: *Dec. 2, 2008

(54) UPLINK POWER CONTROL USING RECEIVED REFERENCE SIGNAL

(75) Inventors: Stephen E. Terry, Northport, NY (US);
Stephen G. Dick, Nesconset, NY (US);
James M. Miller, Verona, NJ (US);
Eldad Zeira, Huntington, NY (US);
Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 70 days.

This patent is subject to a terminal disclaimer.

(21) Appl. No.: 10/857,156

(22) Filed: May 28, 2004

(65) Prior Publication Data
US 2004/0219943 A1 Nov. 4, 2004

Related U.S. Application Data

(63) Continuation of application No. 10/124,030, filed on Apr. 17, 2002, now Pat. No. 6,745,045, which is a continuation of application No. 10/100,383, filed on Mar. 18, 2002, now Pat. No. 6,587,697.

(60) Provisional application No. 60/290,730, filed on May 14, 2001.

(51) Int. Cl.
*H04B 7/00* (2006.01)
(52) U.S. Cl. ............... 455/522; 455/67.13; 455/69; 455/561

(58) Field of Classification Search ............ 455/63.1, 455/67.11, 67.13, 69, 450, 522, 561; 370/342, 370/347
See application file for complete search history.

(56) References Cited

U.S. PATENT DOCUMENTS

| 6,101,179 | A | 8/2000 | Soliman |
| 6,108,561 | A | 8/2000 | Mallinckrodt |
| 6,272,354 | B1 | 8/2001 | Saario |
| 6,628,956 | B2 * | 9/2003 | Bark et al. ............ 455/522 |
| 2002/0077138 | A1 | 6/2002 | Bark et al. |
| 2002/0115468 | A1 | 8/2002 | Haim |

(Continued)

FOREIGN PATENT DOCUMENTS

EP 1 024 606 8/2000

(Continued)

OTHER PUBLICATIONS

THIRD GENERATION PARTNERSHIP PROJECT. "Technical Specification Group Radio Access Network; RRC Protocol (Release 1999)," 3GPP TS 25.331 v3.6.0, Mar. 2001.

(Continued)

*Primary Examiner*—Quochien B. Vuong
(74) *Attorney, Agent, or Firm*—Volpe and Koenig, P.C.

(57) ABSTRACT

A user equipment (UE) receives a reference signal over a physical reference channel using a reference channel receiver and obtains reference power levels from the reference signal. The interference level is obtained and a path loss is calculated in response to the reference signal. Transmit power is then determined for an allocated uplink control channel based, at least in part, upon said path loss and said interference level.

13 Claims, 5 Drawing Sheets

U.S. PATENT DOCUMENTS

2002/0168994 A1 11/2002 Terry et al.

FOREIGN PATENT DOCUMENTS

WO 00/55976 9/2000

OTHER PUBLICATIONS

THIRD GENERATION PARTNERSHIP PROJECT. "Technical Specification Group Radio Access Network; RRC Protocol (Release 1999)," 3GPP TS 25.331 v3.18.0, Mar. 2004.

THIRD GENERATION PARTNERSHIP PROJECT. "Technical Specification Group Radio Access Network; RRC Protocol (Release 4)," 3GPP TS 25.331 v4.0.0, Apr. 2001.

THIRD GENERATION PARTNERSHIP PROJECT. "Technical Specification Group Radio Access Network; RRC Protocol (Release 4)," 3GPP TS 25.331 v4.13.0, Mar. 2004.

THIRD GENERATION PARTNERSHIP PROJECT. "Technical Specification Group Radio Access Network; RRC Protocol Specification (Release 5)," 3GPP TS 25.331 v5.8.0, Mar. 2004.

THIRD GENERATION PARTNERSHIP PROJECT. "Technical Specification Group Radio Access Network; RRC Protocol Specification (Release 6)," 3GPP TS 25.331 v6.1.0, Mar. 2004.

* cited by examiner

UPLINK POWER CONTROL USING RECEIVED REFERENCE SIGNAL

CROSS REFERENCE TO RELATED APPLICATIONS

This application a continuation of application Ser. No. 10/124,030, filed on Apr. 17, 2002, now U.S. Pat. No. 6,745,045 which is a continuation of application Ser. No. 10/100,383, filed on Mar. 18, 2002; now U.S. Pat. No. 6,587,697 and which claims priority from U.S. Provisional Application No. 60/290,730, filed on May 14, 2001, all of which are incorporated herein by reference.

FIELD OF THE INVENTION

The present invention relates to wireless digital communication systems. More particularly, the present invention is directed to a code division multiple access (CDMA) communication system utilizing uplink power control for adaptive modulation and coding.

BACKGROUND

CDMA third generation (3G) cellular telecommunication systems apply adaptive modulation and coding (AM&C) to transmissions to achieve and improve radio resource utilization and provide increased data rates for user services. AM&C techniques take into account RF propagation conditions in advance of transmissions in order to determine modulation and coding rates that will take greatest advantage of current RF propagation conditions.

One method for determining RF propagation conditions is to perform a physical channel quality measurement at the receiver in advance of each transmission. This measurement is sent to the transmitter, which then determines the appropriate modulation and coding rate for the particular transmission based upon the physical channel quality measurement.

RF propagation conditions can change rapidly, particularly for mobile applications. Since the quality measurement of the radio interface is used to determine the appropriate modulation and coding, and since the channel quality measurement can change rapidly due to the changing RF propagation conditions, the performance of the adaptive transmission process is directly related to the time period (i.e. latency) between when a quality measurement is performed and when that transmission is initiated. Therefore, for optimal AM&C, it is necessary to perform channel quality measurements with minimal latency for all users with active data transmissions.

Physical or logical control channels are used to transfer channel quality measurements from a receiver to a transmitter. Channel quality signaling may utilize either dedicated control channels to each user equipment (UE) or common control channels shared by all UEs. When dedicated control channels are used, a continuous signaling channel is available over time for propagation of channel quality measurements for each UE. In terms of performance, this is an optimal solution for AM&C since the quality measurement is continuously available. Transmissions can occur at any time, taking into account the continuously available quality measurement for appropriate modulation and coding settings. Additionally, with a dedicated control channel always available in the uplink, the channel can be also used to support low rate uplink data transmissions.

The difficulty with the dedicated control channel approach is that physical resources are continuously allocated even when there is no data to transmit. A primary application of AM&C techniques are non-real time high data rate services, for example, Internet access. For these classes of service, the best quality of service (QoS) is achieved with short, high rate transmissions with relatively long idle periods between each transmission. These long idle periods result in an inefficient use of dedicated resources.

The problem can be minimized with pre-configured periodic dedicated channel allocations. But this results in periodic unavailability of quality measurements. If the quality measurements are not continuously available, for UEs which have transmissions at any one point in time, only some portion of the UEs will have recent channel quality measurements.

When common control channels are used, a continuous signaling channel is shared by all UEs within a cell. In Third Generation-Time Division Duplex (3G TDD) systems, the uplink common control channel typically occupies a single time slot out of multiple time slots. Procedures are defined for each UE's access to the common control channel and UE identities may be used to distinguish UE specific transactions.

To avoid contention-based access to the uplink common control channel, individual allocations are required to be signaled on the downlink common control channel. Alternatively, some mapping between the downlink allocation and uplink allocation may be defined. Each UE then accesses the uplink common control channel in accordance with its allocation. Since uplink transmissions cannot always be predicted by the network, and since uplink transmissions are infrequent, (in some applications transmitting only 5% of the time), periodic allocations of the uplink common control channel are also necessary for propagating uplink radio resource requests to support uplink user data. Additionally, when common control channels are used for AM&C operation, no inner loop power control mechanism exists for each UE, since the common control channels are not continuously available.

What is needed is an efficient method of performing power control while minimizing the overhead necessary to perform such a method. Power control will minimize the interference introduced by the uplink common control channel.

SUMMARY

The present invention is a user equipment (UE) which receives a communication signal over a physical reference channel using a reference channel receiver. An expected path loss is calculated using a path loss calculation device in response to the received communication signal. A signaling receiver receives an allocation of an uplink control channel including the amount of interference in the channel. Then, a power level calculation device, responsive to the path loss calculation device and the signaling receiver, determines an uplink power level based on the path loss and the interference level, whereby an uplink control channel transmission is initiated having the power level determined by the power level calculation device.

BRIEF DESCRIPTION OF THE DRAWING(S)

DETAILED DESCRIPTION OF THE PREFERRED EMBODIMENT(S)

Figure 1A:
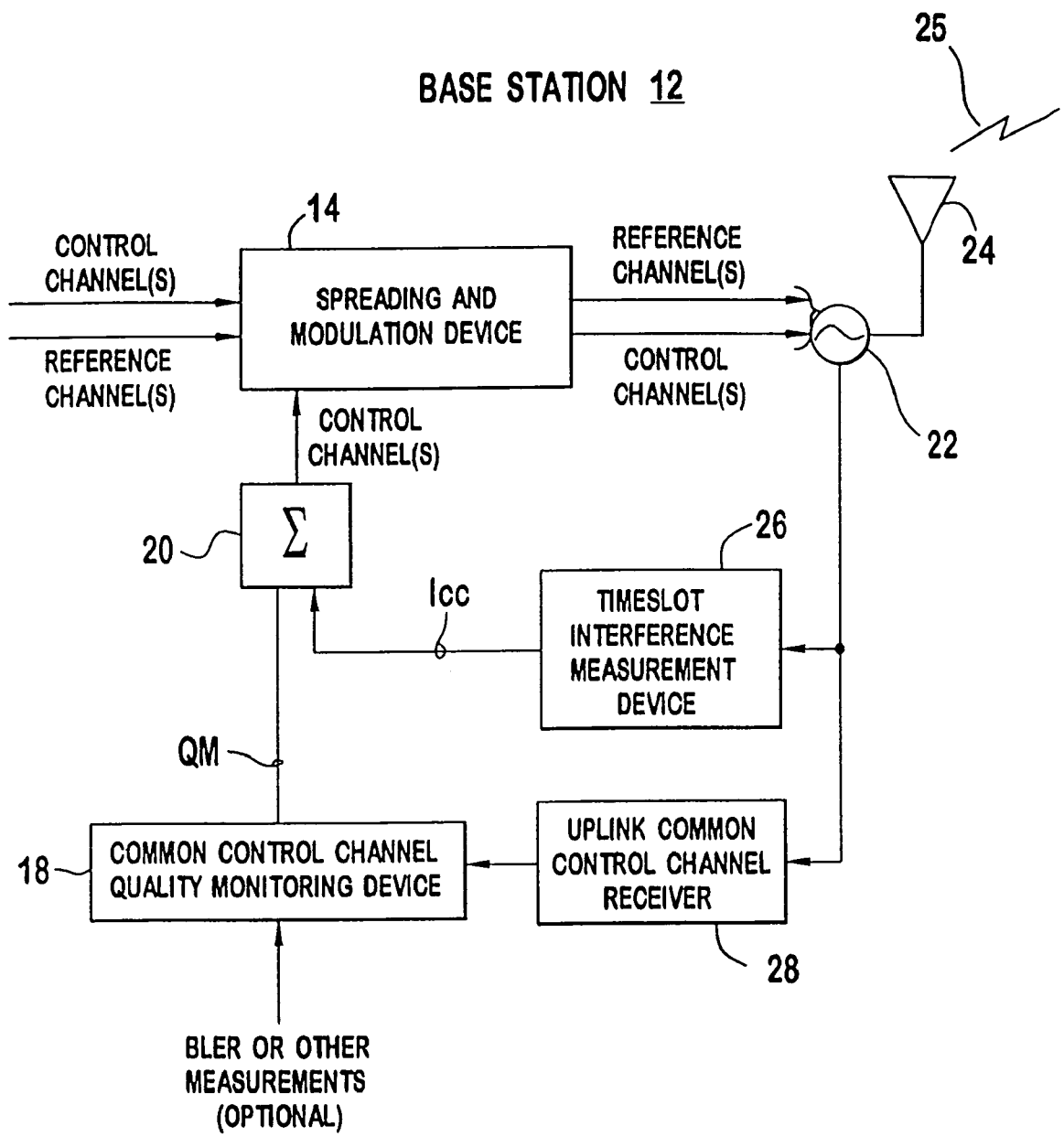
FIG. 1A is a simplified block diagram of a base station of the present invention.

The present invention will be described with reference to the drawing figures wherein like numerals represent like elements throughout.

FIG. 1A is a simplified block diagram of a universal mobile telecommunications system terrestrial radio access network (UTRAN) base station 12, (hereinafter BS 12), which communicates wirelessly over an RF link 25 to a UE 30, (shown in FIG. 1B). The UE 30 may be a wireless cell phone, PDA or other like device which may include additional capabilities such as paging, e-mail and the like.

The BS 12 comprises an antenna 24, (or multiple antennas), an isolator/switch 22 (or like device), a time slot interference measurement device 26, an uplink common control channel receiver 28, a common control channel quality monitoring device 18, a summing device 20 and a reference downlink channel spreading and modulation device 14. The BS 12 receives communications over the radio link 25 via the antenna 24. Received signals are coupled to the interference measurement device 26 and the uplink common control channel receiver 28 through the isolator/switch 22.

The interference measurement device 26 measures time slot interference on the uplink common control channel. For example, the interference measurement device 26 may measure interference signal code power (ISCP). The interference measurement device 26 provides an output (Icc), which is an indicator of the amount of interference on the uplink common control channel.

The receiver 28, which may be a matched filter, RAKE or like device, receives and applies the signal in the uplink common control channel to the channel quality (CQ) measuring device 18 for monitoring the channel quality (CQ) of the uplink common control channel and providing a quality margin (QM) for a given UE.

The QM can be signaled, for example, as a calculated Signal to Interference Ratio target (SIRtarget) that the UE transmissions are expected to achieve. The QM can also be based upon a combination of factors including the SIRtarget, RF propagation conditions and/or the QoS requirements for the service desired by the UE. In turn, the SIRtarget may be based upon measurements from previous transmission from the particular UE, such as the block error rate (BLER). Unlike the uplink interference level, the QM is not required for each individual uplink common control allocation and can, as one option, be separately specified by the BS 12 or even eliminated, as shown in FIG. 1C.

Referring back to 1A, when not specified by the BS 12 or when not constantly updated by the UE 30, the QM may be stored and the most recent QM is used.

The Icc and QM values are applied to first and second inputs of the summing device 20. The output of the summing device 20 is input to the spreading modulation device 14. Although, the QM and the Icc may be combined by the summing device 20 as shown, they may also be encoded into a single parameter, further reducing downlink signaling overhead. As further alternative, the Icc may be signaled separately, for example, on a broadcast channel. In that case, only the QM will need to be signaled. The Icc and QM, if not combined or encoded into a single parameter, may be separately input into the spreading and modulation device 14 and sent over separate downlink channels. The output from the spreading and modulation device 14 is passed to the antenna 24 through the isolator/switch 22 for transmission to the UE 30. The QM and Icc are signaled over one or more downlink control channels. The path loss measurement, (which is performed by the UE 30 as will be explained in further detail hereinafter), is performed on the reference channel.

Figure 1B:
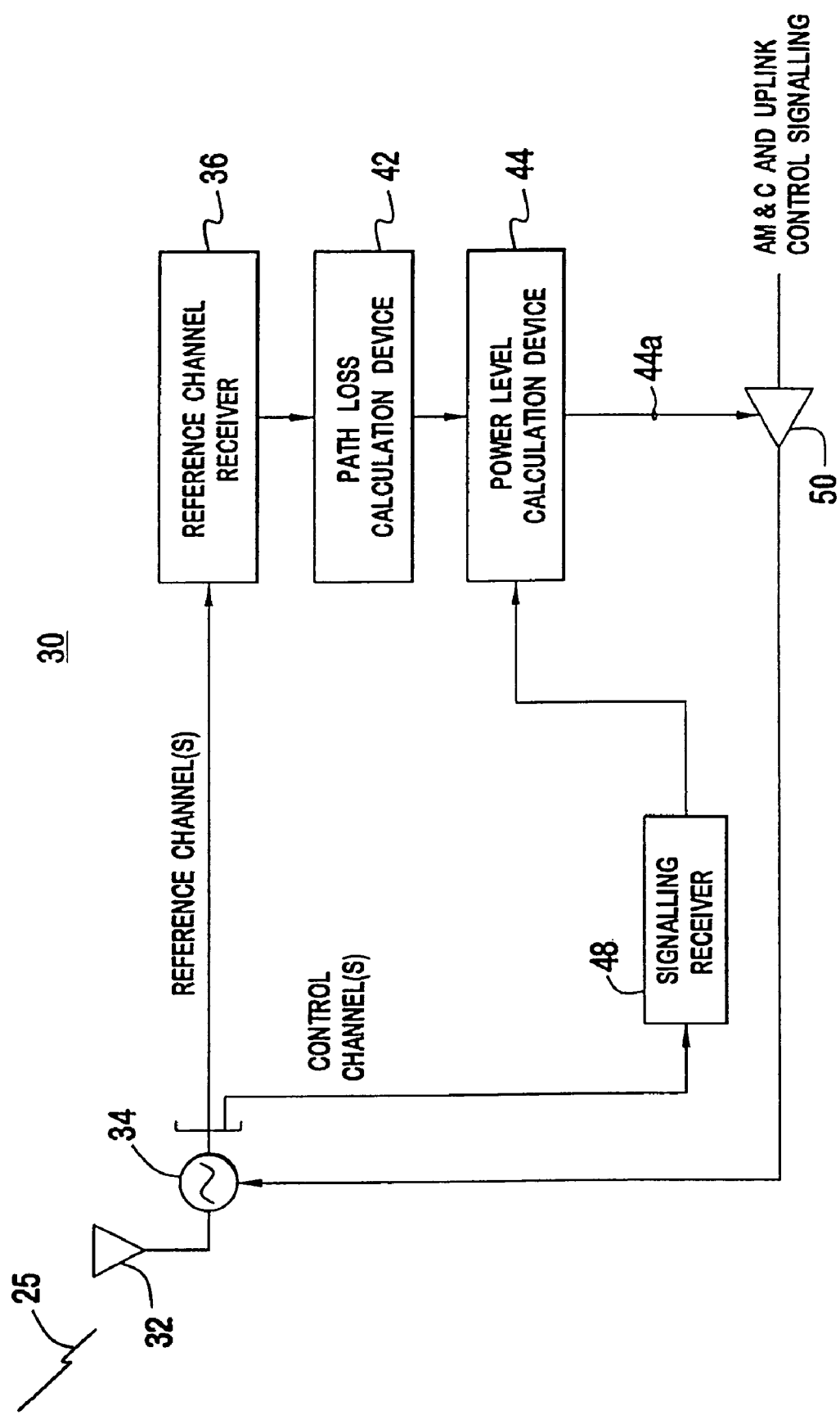
FIG. 1B is a simplified block diagram of a user equipment of the present invention.
Figure 1C:
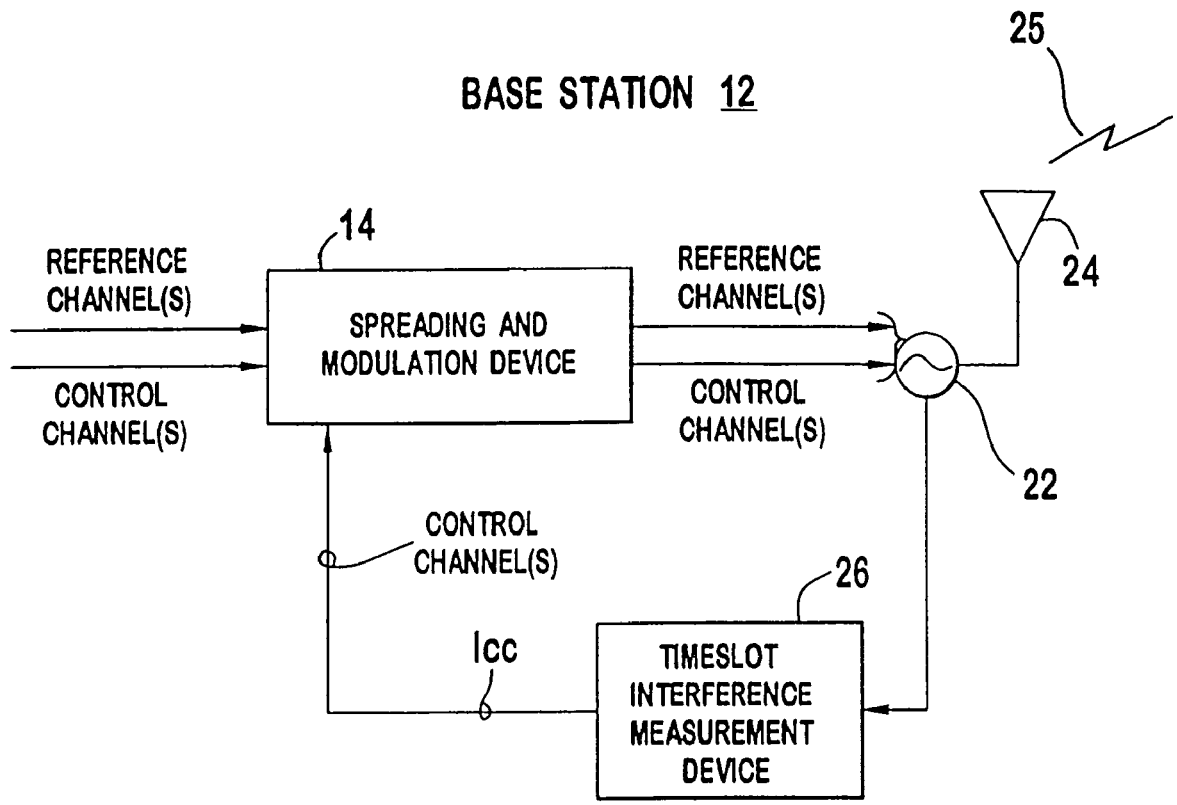
FIG. 1C is a simplified block diagram of an alternative embodiment of a base station of the present invention.

As shown, FIGS. 1A-1C refer to reference channels (and control channel(s)). It should be noted that the present invention comprises only a portion of the signaling that is performed between the base 12 and the UE 30. It is not central to the present invention whether the measurements described herein are sent over a single reference channel, a single control channel or multiple reference and/or control channels. It is contemplated that a combination of reference and/or control channels may be used within the spirit and scope of the present invention.

Referring to FIG. 1B, the UE 30 comprises an antenna 32, an isolator/switch 34, a reference channel receiver 36, a path loss calculation device 42, power level calculation device 44, an adaptive modulation and coding controller 46, a signaling receiver 48, a power amplifier 50. The antenna 32 receives communications from the BS 12 over the RF link 25 and applies the communications through the isolation/switch 34, as appropriate to either the reference channel receiver 36 (i.e., the reference channel(s)), or the signaling receiver 48 (i.e., the control channel(s)).

The reference channel receiver 36, receives and processes one or more reference channels in a manner that is well known to those of skill in the art. Accordingly, such detail will not be included herein. The reference channel receiver 36 performs an estimate of the reference channel for data detection and provides the power level of the received signal to the path loss calculation device 42. The path loss calculation device 42 employs the power level to determine power loss in the downlink transmission.

The QM and Icc information transmitted by the BS 12 are received by the signaling receiver 48, which passes this information to the power level calculation device 44. The power level calculation device 44 uses the outputs of the path loss calculation device 42 and the signaling receiver 48 to determine a proper power level for transmission to BS 12 as a function of path loss and interference in the RF link 25.

The output 44a of the power level calculation device 44 regulates the output power of the UE 10 via control of the power amplifier 50. The power amplifier 50 amplifies, as appropriate.

The output of the amplifier 50 is transmitted to the BS 12 through the isolator/switch 34 and the antenna 32.

As those of skill in the art would understand, TDD utilizes a transmission structure whereby a frame is repetitively transmitted, each frame comprising a plurality of time slots. Data to be transmitted is segmented, and the segmented data is then scheduled for transmission in one or more time slots. For TDD, the CQ interference measurement from the same slot in a previous frame is very valuable in determining the modulation and coding rate of the current frame. As will be described in greater detail hereinafter, the CQ interference measurement as measured at the base station is signaled in the downlink in advance of the common control uplink transmission.

Figure 2:
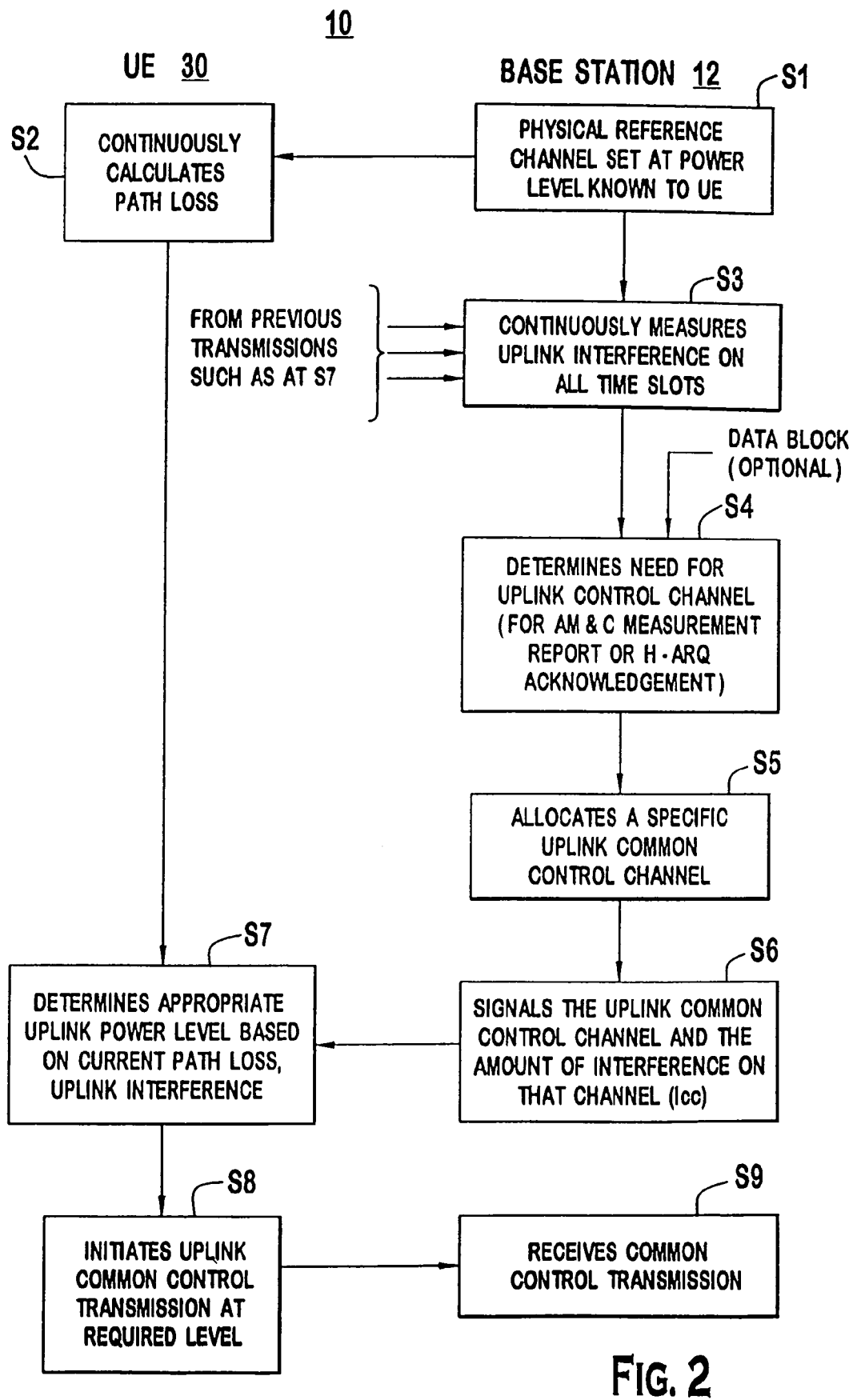
FIG. 2 is a simplified block diagram illustrating one preferred embodiment of the process of the common control channel uplink power control of the present invention.

One embodiment of the method 10 of the present invention is shown in the flow diagram of FIG. 2. In this method, at the BS 12, at step S1, the reference channel is transmitted, with a power level known to the UE 30. The UE 30 continuously calculates path loss at step S2. The BS 12 continuously measures uplink interference on all time slots, at step S3, based on transmissions from the UEs, (only one UE 30 being shown in FIG. 2 for simplicity); and can also be based upon transmissions from other base stations, (only one BS 12 shown for simplicity).

The BS 12, at step S4, determines the need for an uplink common control channel; for example 1) an AM&C measurement report; or 2) Hybrid-Automatic Repeat Request (H-ARQ) control information. This determination may optionally be in response to the receipt of a data block. At step S5, the BS 12 allocates a specific uplink common control channel, indicating the uplink interference level Icc in that time slot. The BS 12 at step S6 signals the uplink common control channel to be utilized and the uplink interference level (Icc) for the allocated channel. These parameters are signaled over a downlink control channel. Note that the parameters of the specific uplink control channel may be implicitly known.

The UE 30, at step S7, determines the appropriate uplink power level for transmission to the BS 12 based upon the current path loss measured by the UE 30 at step S2 and the interference level Icc obtained from the BS 12.

Figure 3:
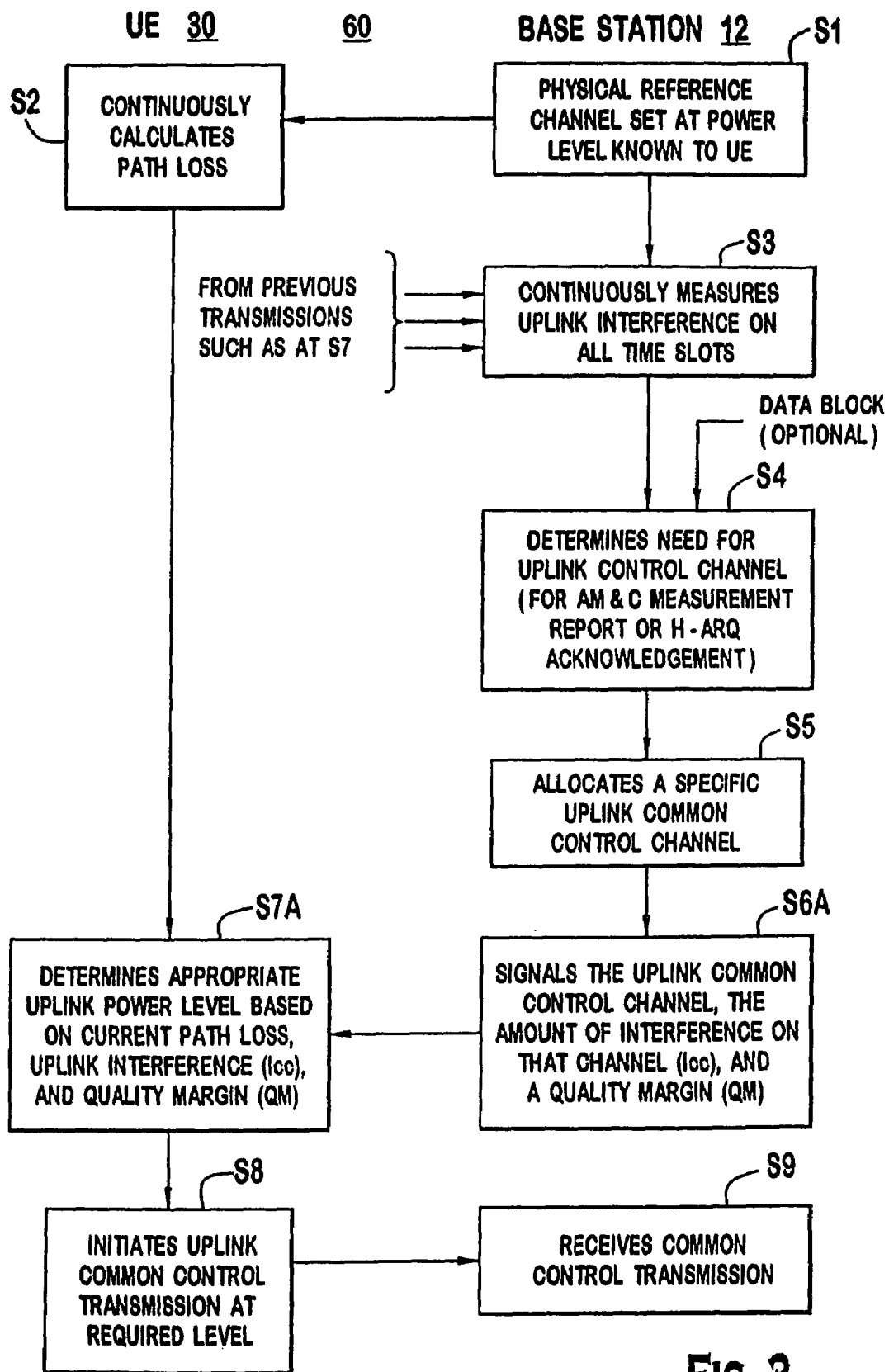
FIG. 3 is a flow diagram showing an alternative embodiment of the present invention.

As stated hereinbefore, in an alternative embodiment the QM may also be signaled along with, or separate from, the interference level Icc. This alternative embodiment of the method 20 of the present invention is shown in FIG. 3, providing further optimization of the uplink common control channel power level. Those steps in FIG. 3 that are numbered the same as FIG. 2 implement the same steps of the procedure. However, further optimization is achieved by additionally signaling a requested QM with the uplink common control channel allocation. The QM is based, among other aspects, upon previous transmissions from the particular UE received at step S3. FIG. 3 shows step S6 modified as step S6A and step S7 modified as step S7A. As shown in both FIGS. 2 and 3, the BS 12 may perform step S4 in response to receiving a data block; or may be independent of whether or not a data block is received.

Referring back to FIG. 2, the transmit power level of a UE (Tue) may be represented by the following equation:

$$Tue = PL + Icc \quad \text{Equation (1)}$$

where PL is the path loss; and Icc is the interference level for an uplink common control channel communication. The path loss (PL) may be calculated as follows:

$$PL = Tref - Rue \quad \text{Equation (2)}$$

where Tref is the power of the reference signal at the BS 12 and Rue is the received power at the UE 30 of the reference signal.

The UE 30 at step S8, initiates an uplink common control transmission at the uplink transmit power level calculated using Equations 1 and 2; the transmission being received by the BS 12, at step S9.

When the QM is transmitted from the BS 12 to the UE 30 as shown in the alternative method 20 of FIG. 3, the transmit power level of a UE (Tue) may be represented by the following equation:

$$TUE = PL + QM + Icc \quad \text{Equation (3)}$$

where PL is the path loss; QM is the desired quality margin and Icc is the interference level for the uplink common control channel communication. The path loss (PL) may be calculated as follows:

$$PL = Tref - Rue \quad \text{Equation (4)}$$

Where Tref is the power of the reference signal at the BS 12 and Rue is the received power of the reference signal at the UE.

The present invention has several advantages over prior art methods. The measured uplink interference level can be specified in the allocation message, assuring a very low latency uplink interference measurement is available to the UE. Alternatively, the measured uplink interference level can be provided via the downlink common control channel or other means. Since the AM&C uplink control channel is expected to exist in a single 3G TDD mode timeslot, still further efficiencies are perceived. Normally, in slotted systems employing similar open loop power control mechanisms, interference must be reported for each slot for proper operation. Since only one slot is used for the uplink common control channel and therefore only the uplink interference for one slot has to be signaled, minimal overhead is introduced to the downlink allocation signaling for the benefit of more efficient use of uplink radio resources.

While the present invention has been described in terms of the preferred embodiment, other variations which are within the scope of the invention as outlined in the claims below will be apparent to those skilled in the art.

What is claimed is:

1. A method for calculating a power level of uplink transmit power, the method comprising:
   receiving a reference signal;
   obtaining a reference power level from the reference signal;
   determining path loss based, at least in part, upon said reference signal;
   receiving a value indicating an uplink interference level;
   receiving a quality margin for the reference signal, said quality margin including an uplink signal to interference ratio target;
   determining an initial uplink transmit power level based, at least in part, upon said path loss, said uplink interference level, and said quality margin; and
   transmitting a hybrid automatic repeat request acknowledgement at said uplink transmit power level.

2. The method of claim 1, wherein the received transmit power includes a power of a reference signal received by a user equipment (UE) performing a calculation of the power level of uplink transmit power.

3. The method of claim 1, wherein the received reference signals includes receiving at least one reference channel.

4. The method of claim 1, wherein determining the path loss includes measuring a power of the reference signals.

5. The method of claim 1 comprising initiating an uplink control transmission.

6. The method of claim 1 wherein determining the initial uplink power level includes initiating an uplink control transmission.

7. The method of claim 1 wherein interference measurements for uplink timeslots provide a value of uplink interference.

8. The method of claim 1, comprising calculating a signal to interference ratio target based on measurements from previous transmissions of a user equipment (UE) receiving and transmitting the measurement representing the path loss.

9. A user equipment (UE) capable of calculating a power level of uplink transmit power, the UE comprising:
   a receiver circuit for receiving a reference signal, an uplink interference level, and a quality margin for the reference signal, the quality margin including an uplink signal to interference ratio target;
   a reference power determining circuit for obtaining reference power levels from the received reference signal;
   a path loss measurement circuit for measuring path loss based on the reference signal;

an uplink power level circuit for determining an initial uplink transmit power level based, at least in part, upon the path loss, the uplink interference level, and the quality margin; and a transmitting circuit for transmitting a hybrid automatic repeat request acknowledgement at the initial uplink transmit power level.

10. The UE of claim 9, wherein:

the reference power determining circuit determines a power of a reference signal received by the UE; and the path loss measurement circuit measures a power of the reference signals.

11. The UE of claim 9 comprising a circuit initiating an uplink control transmission, responsive to the uplink power level circuit, and initiates an uplink control transmission in response to the determination of the initial uplink power.

12. The UE of claim 9 wherein the uplink power level circuit provides interference measurements for uplink timeslots to provide a value of uplink interference.

13. The UE of claim 9, comprising a circuit calculating a signal to interference ratio target based on measurements from previous measurements representing the path loss.

* * * * *